US009026635B2

(12) United States Patent
Maity et al.

(10) Patent No.: US 9,026,635 B2
(45) Date of Patent: May 5, 2015

(54) SYSTEM AND METHOD OF WEB-BASED VIRTUAL MEDIA REDIRECTION

(71) Applicant: American Megatrends, Inc., Norcross, GA (US)

(72) Inventors: Sanjoy Maity, Snellville, GA (US); Baskar Parthiban, Johns Creek, GA (US); Samvinesh Christopher, Suwanee, GA (US); Varadachari Sudan Ayanam, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 203 days.

(21) Appl. No.: 13/841,220

(22) Filed: Mar. 15, 2013

(65) Prior Publication Data
US 2014/0280756 A1    Sep. 18, 2014

(51) Int. Cl.
*G06F 15/173*    (2006.01)
*H04L 29/08*    (2006.01)
*H04L 29/06*    (2006.01)

(52) U.S. Cl.
CPC .............. *H04L 67/02* (2013.01); *H04L 67/06* (2013.01); *H04L 67/38* (2013.01)

(58) Field of Classification Search
CPC ..... H04L 67/02; H04L 41/0253; H04L 41/22; H04L 65/602; G06F 17/30126; G06F 17/3012; G06F 17/30129; G06F 17/30182; G06F 17/30115; G06F 17/30091; G06F 17/3007; G06F 17/30; G06F 17/3002
USPC ......... 709/203, 208, 217, 219, 220, 223, 224, 709/226
See application file for complete search history.

(56) References Cited

U.S. PATENT DOCUMENTS

| 6,112,264 | A | 8/2000 | Beasley et al. |
| 6,378,009 | B1 | 4/2002 | Pinkston et al. |
| 7,945,652 | B2 | 5/2011 | Tsao et al. |
| 8,136,042 | B2 | 3/2012 | Holovacs et al. |
| 8,180,826 | B2 | 5/2012 | Hua et al. |
| 8,560,686 | B2 * | 10/2013 | Ramamurthy ................ 709/224 |
| 8,576,881 | B2 * | 11/2013 | Jungck et al. ................ 370/498 |

(Continued)

OTHER PUBLICATIONS

Fette et al. "The WebSocket Protocol", Dec. 2011.*

(Continued)

*Primary Examiner* — Phuoc Nguyen
*Assistant Examiner* — Davoud Zand
(74) *Attorney, Agent, or Firm* — Morris Manning & Martin, LLP; Tim Tingkang Xia, Esq.

(57) ABSTRACT

Certain aspects of the present disclosure are directed to a method of performing a virtual media redirection. The method includes: (a) establishing a Web Socket connection between a web server of a baseboard management controller (BMC) and a browser program of a computing device in a network, the BMC performing a management function of a host computer; (b) emulating, at the BMC, virtual media to the host computer; (c) receiving, at the BMC, a read command from the host computer and directed to the emulated virtual media, the read command specifying a first file; (d) in response to the read command, sending, at the BMC, a request for the first file according to the read command to the browser program through the Web Socket connection; and (e) receiving, at the web server, the first file from the browser program through the Web Socket connection.

18 Claims, 7 Drawing Sheets

(56) References Cited

U.S. PATENT DOCUMENTS

| | | | |
|---|---|---|---|
| 2003/0217257 A1* | 11/2003 | Ebsen et al. | 713/100 |
| 2006/0267936 A1 | 11/2006 | Hoerl et al. | |
| 2007/0156384 A1* | 7/2007 | Plunkett | 703/23 |
| 2008/0228865 A1 | 9/2008 | Cruzada | |
| 2009/0106356 A1 | 4/2009 | Brase et al. | |
| 2011/0055912 A1* | 3/2011 | Fusari et al. | 726/8 |
| 2011/0066703 A1 | 3/2011 | Kaplan et al. | |
| 2012/0197966 A1 | 8/2012 | Wolf et al. | |
| 2012/0306901 A1 | 12/2012 | Poddar | |
| 2013/0007129 A1 | 1/2013 | German et al. | |
| 2013/0013671 A1* | 1/2013 | Relan et al. | 709/203 |
| 2014/0281894 A1* | 9/2014 | Maity et al. | 715/234 |

OTHER PUBLICATIONS

Korean Intellectual Property Office, "International Search Report", published on Dec. 31, 2013, Korea.

* cited by examiner

SYSTEM AND METHOD OF WEB-BASED VIRTUAL MEDIA REDIRECTION

FIELD

The present disclosure relates to the field of computer systems, and particularly to a system and method of web-based virtual media redirection between a host computer and a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

A BMC may implement virtual media redirection. However, unaddressed needs exist in implementation of virtual media redirection.

SUMMARY

Certain aspects of the present disclosure are directed to a method of performing a virtual media redirection. The method includes: (a) establishing a Web Socket connection between a web server of a baseboard management controller (BMC) and a browser program of a computing device in a network, the BMC performing a management function of a host computer; (b) emulating, at the BMC, virtual media to the host computer; (c) receiving, at the BMC, a read command from the host computer and directed to the emulated virtual media, the read command specifying a first file; (d) in response to the read command, sending, at the BMC, a request for the first file according to the read command to the browser program through the Web Socket connection; and (e) receiving, at the web server, the first file from the browser program through the Web Socket connection.

In certain embodiment, the method includes: (a) receiving, at a Web Socket module of the BMC, a Web Socket handshake request from a Web Socket module of the computing device; and (b) sending, by the Web Socket module of the BMC, a handshake response message corresponding to the Web Socket handshake request back to the Web Socket module of the computing device to establish the Web Socket connection. In certain embodiments, the method also includes: (a) generating, at the web server of the BMC, a redirection webpage, and the redirection webpage is programmed to instruct the browser program to access a file or a file system structure in a storage of the computing device; and (b) sending, at the web server, the redirection webpage to the browser program. The redirection webpage is programmed to instruct the browser program to (a) retrieve the first file from the storage in accordance with the request and (b) send the first file to the web server through the Web Socket connection.

In certain embodiment, the method includes sending, at the web server, java objects to the browser program. The java objects are compiled to provide functions that allow the browser program to access files in the storage. The java objects are compiled to call Java Native Interface functions to access the files in the storage. The redirection page is programmed to instruct the browser program to download the java objects. The redirection page is programmed to instruct the browser program to access a file or a file system structure from an ISO image in the storage, and the first file is located in the ISO image. The storage is an external storage to the computing device. The redirection page is programmed to instruct the browser program to send a file system structure or a file of a selected media in the storage to the web server through the Web Socket connection.

In certain embodiments, the method further includes connecting the BMC to an input/output (I/O) port of the host computer such that the virtual media emulated by the BMC is accessible for the host computer through the I/O port. In certain embodiments, the I/O port is a USB port. In certain embodiments, the Web Socket connection is a secure Web Socket connection.

Certain aspects of the present disclosure are directed to a baseboard management controller (BMC). The BMC includes a web server configured to establish a Web Socket connection between the BMC and a browser program of a computing device in a network and to receive a first file from the browser program through the Web Socket connection. The BMC also includes a redirection module configured to emulate a virtual media to the host computer; receive a read command from the host computer and directed to the emulated virtual media, the read command specifying a first file; and in response to the read command, send a request for the first file according to the read command to the browser program through the Web Socket connection. The BMC performs a management function of a host computer.

Certain aspects of the present disclosure are directed to a non-transitory computer storage medium. The non-transitory computer storage medium stores computer-executable instructions. When the computer-executable instructions are executed by a processor of a baseboard management controller, the computer-executable instructions cause the processor to: (a) establish a Web Socket connection between a web server of the BMC and a browser program of a computing device in a network, the BMC performing a management function of a host computer; (b) emulate virtual media to the host computer; (c) receive a read command from the host computer and directed to the emulated virtual media, and the read command specifies a first file; (d) in response to the read command, send, at the BMC, a request for the first file according to the read command to the browser program through the Web Socket connection; and (e) receive, at the web server, the first file from the browser program through the Web Socket connection.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
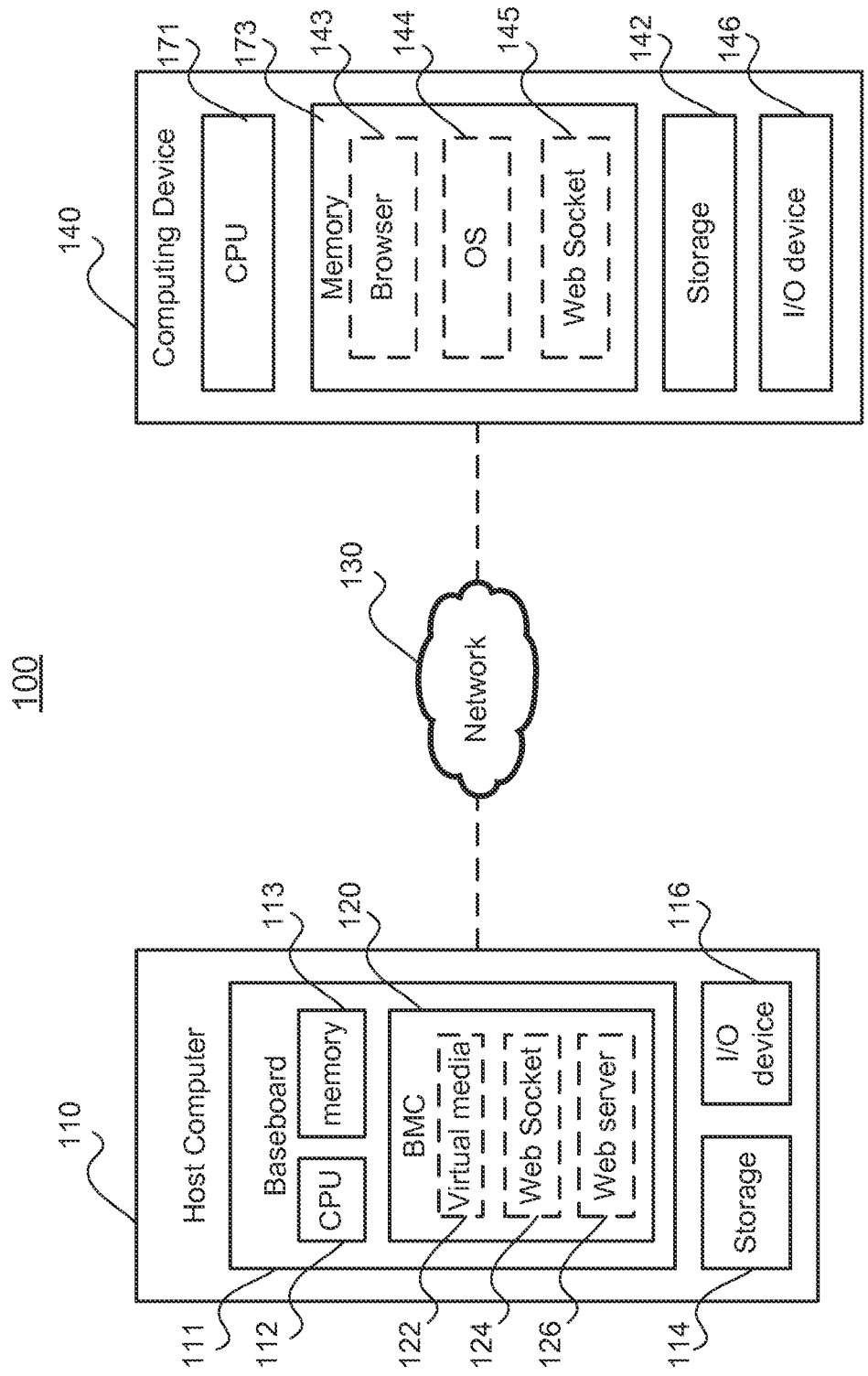
FIG. 1 schematically depicts a web-based virtual media redirection system according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

FIG. 1 schematically depicts web-based virtual media redirection system according to one embodiment of the present disclosure. As shown in FIG. 1, the system 100 includes a host computer 110 and a computing device 140 connected to the host computer 110 via a network 130. The system 100 can be a system that incorporates more than one interconnected system, such as a client-server network. The network 130 may be a wired or wireless network, and may be of various forms such as a local area network (LAN) or wide area network (WAN) including the Internet.

The host computer 110 may be a general purpose computer system. The host computer 110 includes a baseboard 111, or the "motherboard". The baseboard 111 is a printed circuit board to which a multitude of components or devices may be connected by way of a system bus or other electrical communication paths. Although not explicitly shown in FIG. 1, the components on the baseboard 111 are interconnected, and the layout of the components on the baseboard 111 and the manner of the interconnection between the components on the baseboard 111 is herein referred to as the configuration of the baseboard 111. One of ordinary skill in the art would appreciate that the configuration of the baseboard 111 may be adjusted or changed according to the necessary design or manufacturing requirements.

The components on the baseboard 111 include, but not limited to, a central processing unit (CPU) 112, a memory 113, a baseboard management controller (BMC) 120, and other required memory and Input/Output (I/O) modules (not shown). The CPU 112, the memory 113, and the BMC 120 may be embedded on the baseboard 111, or may be connected to the baseboard 111 through an interface. In certain embodiments, the interface may be physical hardware interface such as electrical connectors, buses, ports, cables, terminals, or other I/O devices.

The CPU 112 is a host processor which is configured to control operation of the host computer 110. The host processor can execute an operating system (OS) or other applications of the host computer 110. In some embodiments, the host computer 110 may have more than one CPU as the host processor, such as two CPUs, four CPUs, eight CPUs, or any suitable number of CPUs.

The memory 113 can be a volatile memory, such as the random-access memory (RAM), for storing the data and information during the operation of the headless server 200.

The BMC 120 refers to a specialized microcontroller that manages the interface between system management software and platform hardware. Different types of sensors can be built into the system 100, and the BMC 120 reads these sensors to obtain parameters such as temperature, cooling fan speeds, power status, OS status, etc. The BMC 120 monitors the sensors and can send alerts to a system administrator via the network if any of the parameters do not stay within preset limits, indicating a potential failure of the system 100. The administrator can also remotely communicate with the BMC 120 to take some corrective action such as resetting or power cycling the system to get a hung OS running again. Further, the BMC 120 can include a virtual media redirection module, which allows establishing a virtual media accessible by the host computer 110. Thus, a user may initiate a virtual media session from the computing device 140 and provides data on the computing device as content of the virtual media to the host computer 110 through the BMC 120.

In certain embodiments, firmware of the BMC 120 adheres to the Intelligent Platform Management Interface (IPMI) industry standard for system monitoring and event recovery. The IPMI protocol is a standardized computer system interface protocol for out-of-band management of computer systems and monitoring of the operation, which is session-based, requiring an IPMI session be established between the application module and the target IPMI device before the application module can communicate with the target IPMI device. The IPMI specification provides a common message-based interface for accessing all of the manageable features in a compatible computer, and includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC through an operating system or through an external connection, such as through a network or serial connection. The BMC can receive IPMI instructions or requests from a locally connected management computer through a system interface, or as external requests through a network interface.

In certain embodiments, the BMC 120 includes, among other things, a virtual media module 122, a Web Socket module 124 and a web server module 126. The virtual media module 122 can emulate a physical storage media as if it were physically attached to the host computer 110. The Web Socket module 124 can establish full-duplex communications channels under the Web Socket protocol over a single transmission connection protocol (TCP) connection. The web server module 126 can provide web contents accessible through the Internet. Details of the modules will be described later.

Further, the host computer 110 includes a storage 114, which is a data storage media for storing the OS (not shown) and other applications of the host computer 110, and at least one I/O device 116. Examples of the storage 114 may include flash memory, memory cards, USB drives, hard drives, floppy disks, optical drives, or any other types of data storage devices. Examples of the I/O device 116 include keyboards, touch pads, mouse, microphones, display screens, touch screens, or other I/O devices applicable for the host computer 110.

A computing device 140 is remotely connected to the host computer 110 via the network 130. One of ordinary skill in the art would appreciate that the system 100 may include a plurality of computing devices 140 simultaneously remotely connected to the host computer 110. Examples of the computing device 140 may include, for example, portable devices such as smartphones, tablets or other mobile computer devices.

The computing device 140 includes a CPU 171, a memory 173, and storage 142. The storage 142 is a data storage media for storing the OS and other applications of the computing device 140. Examples of the storage 142 of the computing device 140 may include flash memory, memory cards, USB drives, hard drives, floppy disks, optical drive, or any other types of data storage devices.

A browser program 143 can be loaded in the memory 173 and executed by the CPU 171 of the computing device 140. The browser program 143 is a software application for retrieving, presenting and traversing information resources to the user. Further, the browser program 143 can serve as a virtual media redirection client of the system 100 for communicating with the host computer 110. Generally, the browser program 143 may retrieve the information resources provided on an open network, such as the Internet. The information resources may include web page, image, video or other types of data contents.

Further, the memory 173 can load an OS 144 and a Web Socket module 145. The Web Socket module 145 is a module corresponding to the Web Socket module 124 of the BMC 120 on the host computer 110, such that the full-duplex communications channels under the Web Socket protocol may be established between the host computer 110 and the computing device 140.

Further, the computing device 140 has at least one I/O device 146. Examples of the I/O device 146 include keyboards, touch pads, mouse, microphones, display screens, touch screens, or other I/O devices applicable for the computing device 140. Some I/O devices, such as touch screens, are provided for the dual input/output purposes for the computing device 140.

For displaying the information resources such as the web pages and other data contents using the browser program 143, HyperText Markup Language (HTML) is a standardized markup language in a web-based language format for displaying the web pages and other information that can be displayed in the browser program 143. Data in the HTML format is written in the form of HTML elements, or "tags", which are enclosed in angle brackets (such as <html>), within the web page contents. Currently, the HTML format is widely adopted by almost all of the browser programs on the market, and is thus suitable as the web-based language format of the communicating instructions between the browser program 143 on the computing device 140 side and the web server 126 of the BMC 120 on the host computer 110 side.

Generally, a scripting language such as JavaScript is used in addition to the HTML format language to control input and output of the user interface. Further, HTML5, which is the currently developing revision of the HTML language, provides extensive features for web storage, which utilizes web application software methods and protocols used for storing data through a web browser. Older common used browser programs do not support the HTML5 format, but the browser programs supporting the HTML5 format include MOZILLA FIREFOX 1.5, GOOGLE CHROME 4.0, SAFARI 3.1, SAFARI MOBILE 3.2, OPERA 9.0, OPERA MOBILE 10.0, ANDROID BROWSER 2.1, AND INTERNET EXPLORER 9.0, or any newer version of these browser programs. Thus, the browser program 143 can support HTML5 and can be one of the browser programs listed above.

The browser program 143 can communicate with the web server 126 at the BMC using the Hypertext Transfer Protocol (HTTP). Specifically, the browser program 143 may send an HTTP request to the web server 126. Upon receiving the HTTP request, the server sends an HTTP response in response to the HTTP request to the browser program.

The web server 126 typically cannot initiate a data transmission to the browser program 143 under HTTP. Web Socket can provide full-duplex communications channels over a single TCP connection such that the server may actively send instruction or information to the client. Web Socket is incorporated into HTML5, and thus is supported by web browsers and servers implementing HTML5.

Figure 2:
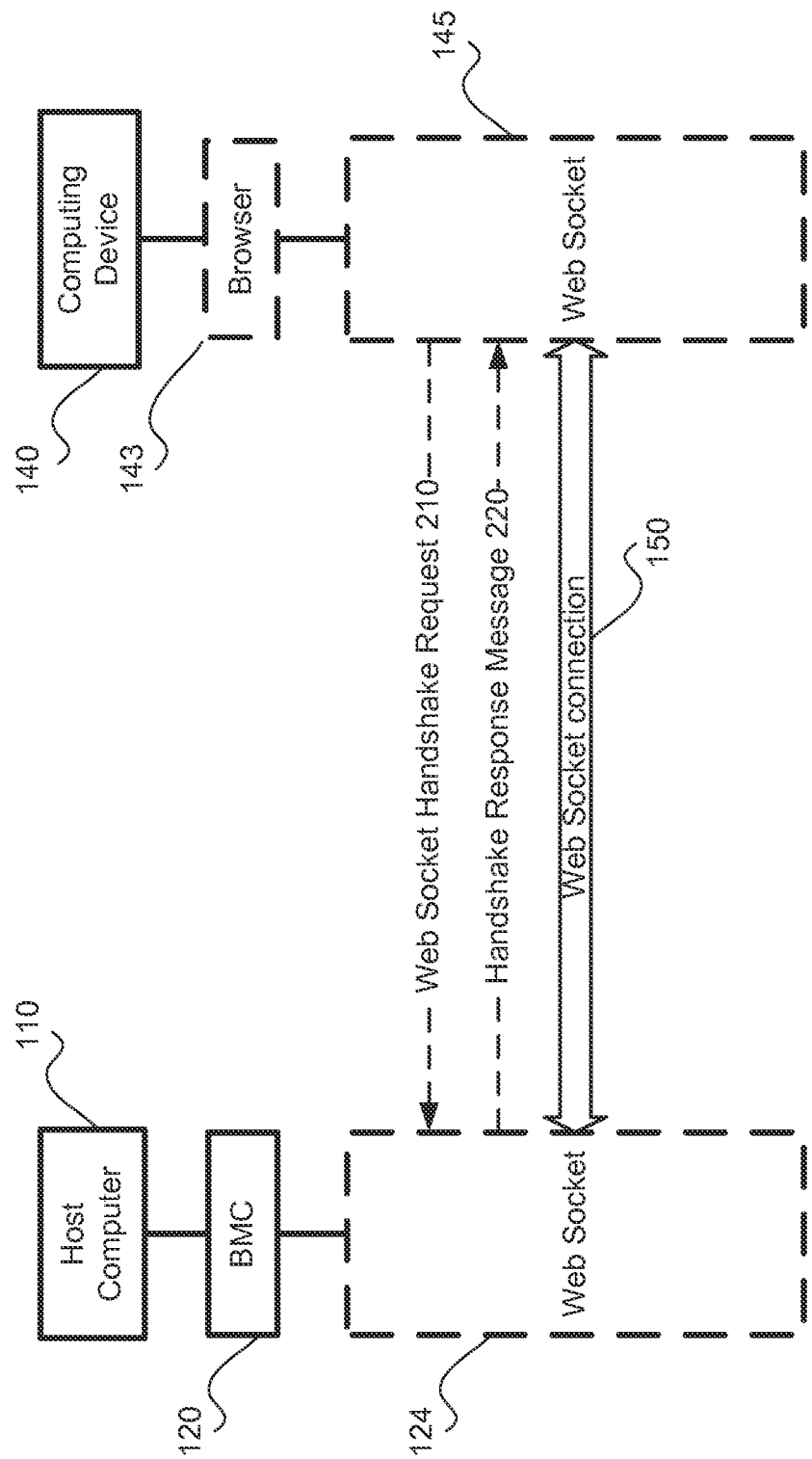
FIG. 2 schematically depicts a Web Socket connection according to one embodiment of the present disclosure.

FIG. 2 shows the process of establishing the Web Socket connection between the host computer 110 and the computing device 140 according to one embodiment of the disclosure. The Web Socket connection starts in a similar way to the HTTP connection, but provides continuous two-way web-based connection between the host computer 110 and the browser program 124. When the browser program 143 attempts to establish a Web Socket connection, the browser program 143 instructs the Web Socket module 145 to send a Web Socket handshake request to port 80 (the default HTTP port) or port 443 (the HTTPS port) of the Web Socket module 124 of the BMC 120. The Web Socket handshake request resembles the GET command used in the HTTP request, but includes more Web Socket instructions and can be seen as an "upgraded" request. Upon receiving the Web Socket handshake request, the web server 126 can identify the request as the Web Socket handshake request and not an HTTP request according to the upgraded information in the Web Socket handshake request. The web server 126 sends a handshake response message to the browser program 143. Accordingly, a Web Socket connection 150 can be established between the browser program 143 and the web server 126.

Figure 3A:
FIG. 3A depicts an example of an HTTP request using the GET instruction and an HTTP response.
Figure 3B:
FIG. 3B depicts examples of Web Socket handshake request and response according to one embodiment of the present disclosure.
Figure 3B:

FIGS. 3A and 3B provide a comparison between the Web Socket handshake request and the HTTP request, where FIG. 3A shows an example of the HTTP request using the GET command, and FIG. 3B shows an example of the Web Socket handshake request. As shown in FIG. 3A, the header portion of the response message to the HTTP request indicates information of the contents in the response message, include the type of content being text/html files, the length of the content file, and the language used in the content. The last line of the header portion of the response message to the HTTP request indicating that the connection between the host computer 110 and the browser program 124 is closed at the end of the response. In comparison, the first two lines of the Web Socket handshake request as shown in FIG. 3B include the same GET instructions as the HTTP request. The following lines of the Web Socket handshake request include the upgraded information, informing the Web Socket module 124 to upgrade, or to switch from the regular HTTP request to the Web Socket protocol. Further, unlike the response message to the HTTP request, the header portion of the handshake response message to the Web Socket handshake request does not indicate that the connection is closed at the end of the response.

Once the Web Socket connection 150 is set up, both the Web Socket module 124 and the Web Socket module 145 can send data over the connection to the other end. The data format can be in any valid UTF-8 string format, such as JSON or XML, but other data format may be used if desired.

The Web Socket modules 124 and 145 can be of various types and designs, such as PHP Web Sockets, Java jWeb Socket, Web-Socket-ruby, Socket IO-node, or other types of Web Socket applications. To set up the Web Socket module 124 as a Web Socket server on the host computer 110 side, the domain name or the IP address of the host computer 110 and the port used (such as port 80 or port 443) must be provided to indicate the location of the host computer 110, and a plurality of instructions must be set up in response to certain "events" such as opening a socket (i.e. a Web Socket connection), receiving the handshake request and other messages in the socket, or closing a socket. When the Web Socket server is set up, a Web Socket client may connect to the Web Socket server using the uniform resource locator (URL) starting with the scheme "ws" instead of the regular HTTP scheme "http", or the scheme "wss" instead of the regular HTTPS scheme "https".

Figure 4A:
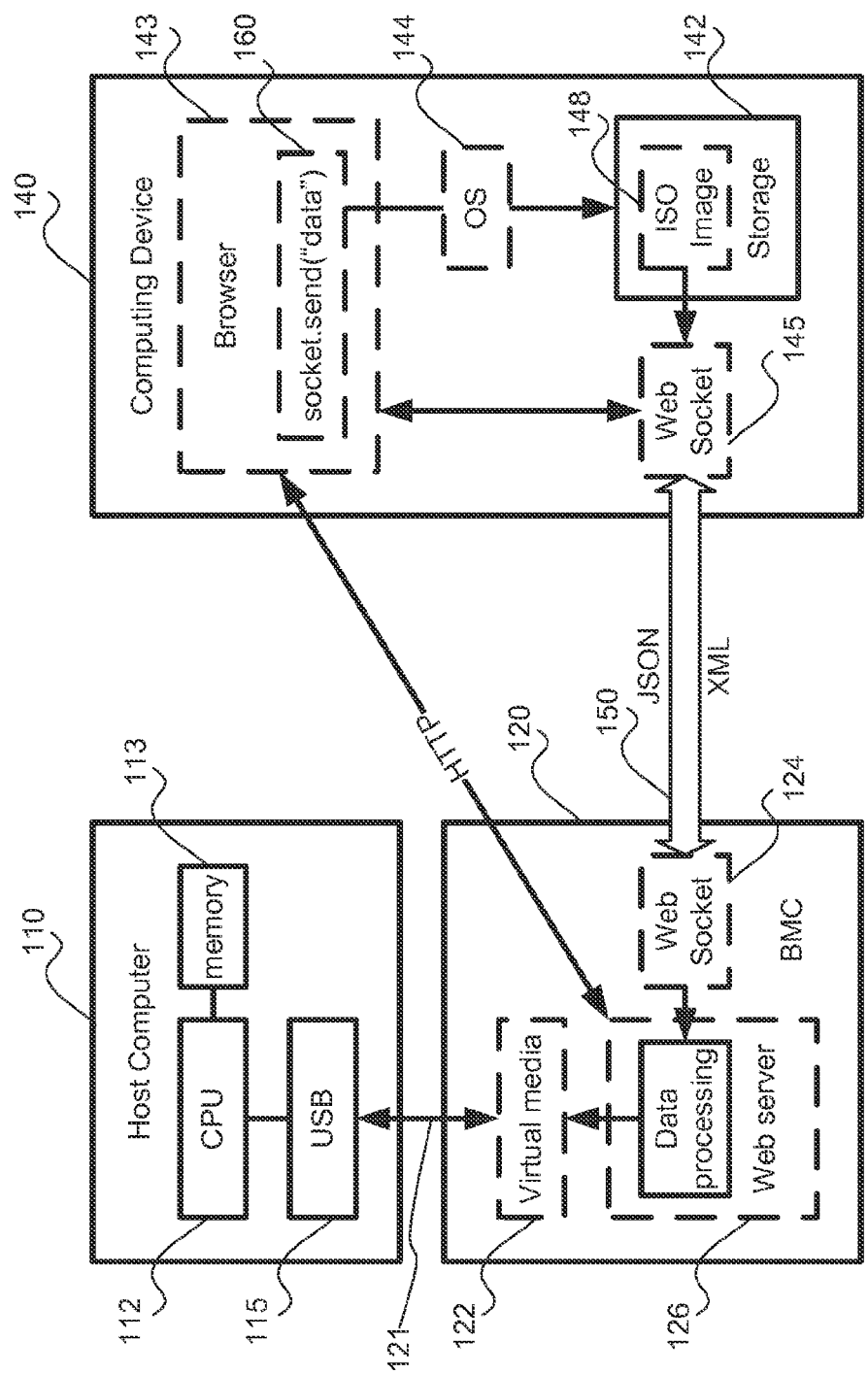
FIG. 4A schematically depicts a web-based virtual media redirection according to one embodiment of the present disclosure.
Figure 4B:
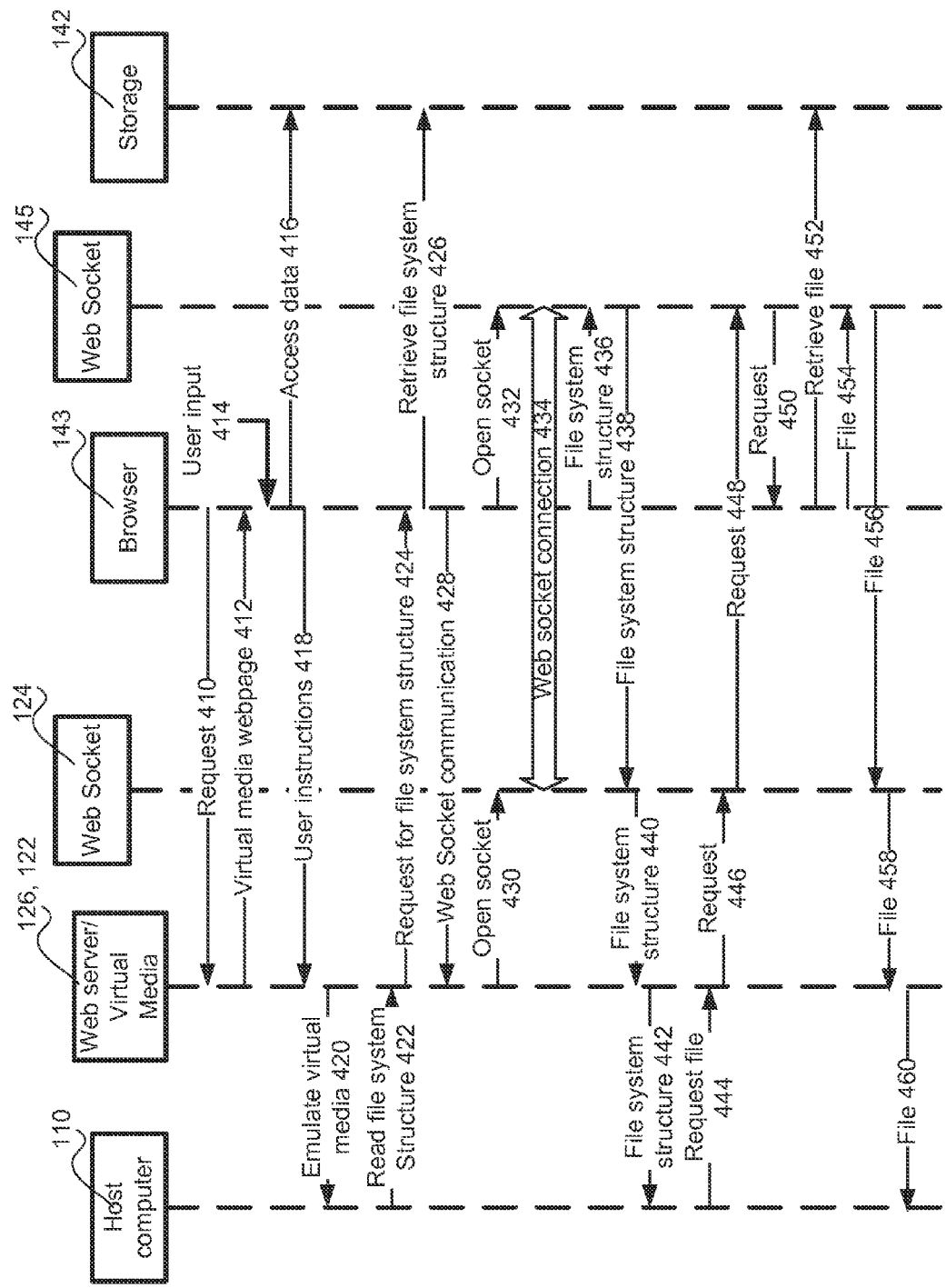
FIG. 4B schematically depicts the web-based virtual media redirection process in FIG. 4A.

FIGS. 4A and 4B show features of a web-based virtual media redirection according to certain embodiments of the present disclosure. As shown in FIG. 4A, the host computer 110 may include a USB port 115 as the I/O device. The BMC 120 may have a virtual media module 122 that communicates with the host computer 110 through a USB connection 121 established with the USB port 115 and that emulates a media storage to the host computer 110 through the USB connection 121. The USB connection allows the BMC 120 to emulate USB mass storage devices, such as a floppy, CD-ROM, or hard disk drive, to the host computer 110. In certain embodiments, those emulated devices can be used by the host computer 110 as boot-up devices. As will be discussed in detail below, the computing device 140 can provide programs or data, which may include a boot-up sequence, to the BMC 120. The BMC 120 can provide those programs or data to the host computer 110 as programs or data of the emulated devices. In certain embodiments, upon the virtual media module 122 emulates a bootup device to the host computer 110, the host computer 110 may boot from program and data of the computing device 140 that are transmitted to the BMC 120 and that are used as content of the bootup device. Although not explicitly shown, the host computer 110 and the computing device 140 may include other elements to perform the web-based virtual media redirection.

As an example, the BMC 120 may emulate a mass storage device, such as the emulated CD-ROM device, on a USB connection. The emulated CD-ROM device may be utilized to redirect the content of an ISO image 148 on the computing device 140 to the host computer 110. The emulated CD-ROM device may also be utilized for providing out-of-band communication between the host computer 110 and the BMC. The emulated CD-ROM device appears to the host computer 110 as a standard USB CD-ROM. Accordingly, the operating system executing on the host computer 110 can utilize a standard CD-ROM driver provided of the operating system utilized for communicating with the CD-ROM device. Custom hardware drivers may be unnecessary.

In certain embodiments, the computing device 140 includes an operating system 144 and a browser program 143 running on top of the operating system 144. Further, the computing device 140 includes a storage 142 that stores the ISO image 148. The ISO image 148 typically is an archive file or disk image, including a file system and data, of an optical disc. In certain embodiments, the browser program 143 complies with the HTML5 standard, and can read the ISO image 148 directly without using any native calls. For example, when given the location of the ISO image 148, the browser program 143 can directly utilize the OS 144 to access the ISO image 148 and read the content of the ISO image 148. As will be discussed in detail below, the browser program 143, as instructed by a webpage generated at the web server 126 of the BMC 120, can send information of the ISO image 148, such as a file system structure (e.g. a list of filenames of the file system in the ISO image 148) and data of a particular file, to the BMC 120. The information can be communicated to the BMC 120 through a Web Socket. Once receiving the information, the BMC 120 can utilize the virtual media module 122 to provide the information as the data of an emulated media to the host computer 110.

FIG. 4B illustrates procedures of a media redirection among the host computer 110, the BMC 120, and the computing device 140 in accordance with certain embodiments of the present disclosure. At operation 410, the browser program 143 sends a request to the BMC 120 for a virtual media redirection webpage via the network. The request may be in the HTTP format. Upon receiving the request for the virtual media redirection webpage, at operation 412, the web server 126 of the BMC 120 sends the virtual media redirection webpage to the browser program 143. Thus, the browser program 143 may display the virtual media redirection webpage, allowing the user of the computing device 140 to input or select the configuration information of a virtual media that is to be emulated by the BMC 120 at operation 414. The configuration information of the virtual media may include the type of the virtual media to be emulated by the BMC 120 and the data on the computing device 140 that are to be emulated as the content of the emulated virtual media. In certain embodiments, the virtual media webpage may provide a list of the ISO image files in the storage 142, and a list of various types of the virtual media, e.g., CD-ROM, SD memory, USB drive, etc., for the user to select therefrom. For example, the virtual media redirection webpage rendered by the browser program 143 can use JavaScript to instruct the browser program 143 to access the file system of the computing device 140 and obtain a list of available ISO images.

At operation 414, a user can configure the virtual media module through the virtual media redirection webpage rendered at the browser program 143. For example, the user can configure the BMC 122 to emulate a CD-ROM to the host computer 110 and use the data of the ISO image 148 as the data of the emulated CD-ROM. After the user inputs the configuration information, at operation 416, the browser program 143 can access the selected data, e.g., the ISO image 148 stored in the storage 142, according to the user input. For example, the browser program 143 executes the JavaScript contained in the virtual media redirection webpage and accordingly is instructed to access a selected ISO image 148. Then, at operation 418, the browser program 143 sends the user instructions for setting up the virtual media module 122 to the web server 126 of the BMC 120. Upon receiving the user instructions, at operation 420, the virtual media module 122 emulates the requested type of virtual media (e.g., a CD-ROM) to the host computer 110.

When the host computer 110 detects the emulated virtual media and perceives it as a real physical media, at operation 422, the host computer 110 may attempt to read the file information of the emulated virtual media. In certain embodiments, the file information includes the file system structure, e.g., a list of filenames of the virtual media. Upon receiving the request for the file system structure, at operation 424, the virtual media module 122 can instruct the web server to send a HTTP response message, e.g. a webpage having JavaScript requesting the file system structure of the ISO image 148, to the browser program 143. When the browser program 143 receives the HTTP response message, at operation 426, the browser program 143, e.g. as instructed by the JavaScript, accesses the ISO image 148 stored in the storage 142 to retrieve the file system structure.

Then, in certain embodiments, at operation 428, the browser program 143 sends a Web Socket handshake request to the web server 126 for establishing a communication channel under the Web Socket protocol. Upon receiving the Web Socket handshake request, at operation 430, the web server 126 instructs a Web Socket module 124 at the BMC 120 to open a web socket. Similarly, at operation 432, the browser program 143 instructs a Web Socket module 145 at the computing device 140 to open a web socket. At operation 434, a Web Socket connection (or communication channel) may be established between the Web Socket module 124 and the Web Socket module 145.

Once the Web Socket connection is established, at operation 436, the browser program 143 sends the retrieved file system structure at operation 426 to the Web Socket module 145. At operation 438, the Web Socket module 145 at the computing device 140 sends the file system structure to the Web Socket module 124 at the BMC 120 through the Web Socket connection. At operation 440, the Web Socket module 124 sends the file system structure to the web server 126 of the BMC 120. The web server 126 then sends the file system structure to the virtual media module 122. The virtual media module 122 provides the file system structure to the host computer 110 at operation 442 as a result of the read file system structure operation initiated by the host computer 110 at operation 422 and directed to the virtual media emulated by the virtual media module. Thus, the host computer 110 obtains an emulated file system structure of the virtual media, and may request files and data from the virtual media.

When the host computer 110 attempts to read a certain file from the emulated virtual media, at operation 444, the virtual media module 122 receives such a read operation initiated by host computer 110. The virtual media module 122 then instructs the web server 126 the request of the host computer 110 for a particular file. The web server 126 then sends the request for file to the browser program 143 through the web socket connection 150. Specifically, at operation 446, the web server 126 sends the request to the Web Socket module 124. At operation 448, the Web Socket module 124 sends the request to the Web Socket module 145 through the Web Socket connection. Then, at operation 450, the Web Socket module 145 sends the request to the browser program 143. Upon receiving the request, at operation 452, the browser program 143 executes a routine defined for handling such an event in a webpage that is generated by the web server 126 and that is currently rendered by the browser program 143. For example, the routine may instruct the browser program 143, according to the request received through the web socket connection, to access the ISO image 148 stored in the storage 142 to retrieve the file specified in the request.

Once having retrieved the requested file, the browser program 143, as instructed by the webpage being rendered, may transmit the retrieved file to the BMC 120 through the Web Socket connection 150. For example, the webpage may contain a JavaScript function, such as socket.send ("data") that sends data through the Web Socket connection 150. Specifically, at operation 454, the browser program 143 sends the file to the Web Socket module 145. At operation 456, the Web Socket module 145 sends the file to the Web Socket module 124 through the Web Socket connection 150. At operation 458, the Web Socket module 124 sends the file to the web server 126 at the BMC 120. The web server 126 then sends the file to the virtual media module 122. The virtual media module 122 provides the file to the host computer 110, at operation 442, as a result of the read command initiated by the host computer 110 at operation 444 and directed to the virtual media emulated by the virtual media module 122. Thus, the host computer 110 can read the file from the emulated virtual media.

Figure 5A:
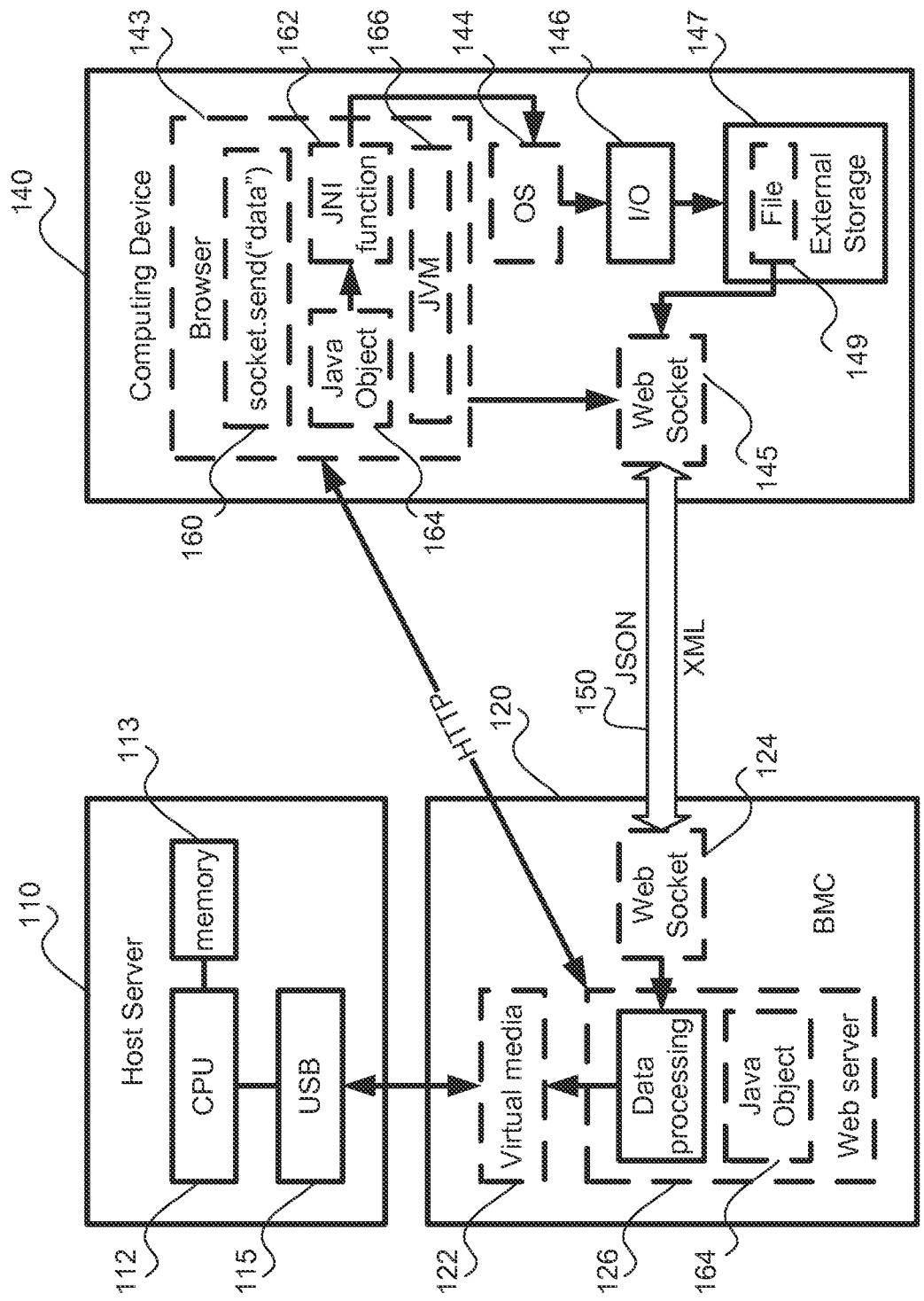
FIG. 5A schematically depicts a web-based virtual media redirection according to another embodiment of the present disclosure.
Figure 5B:
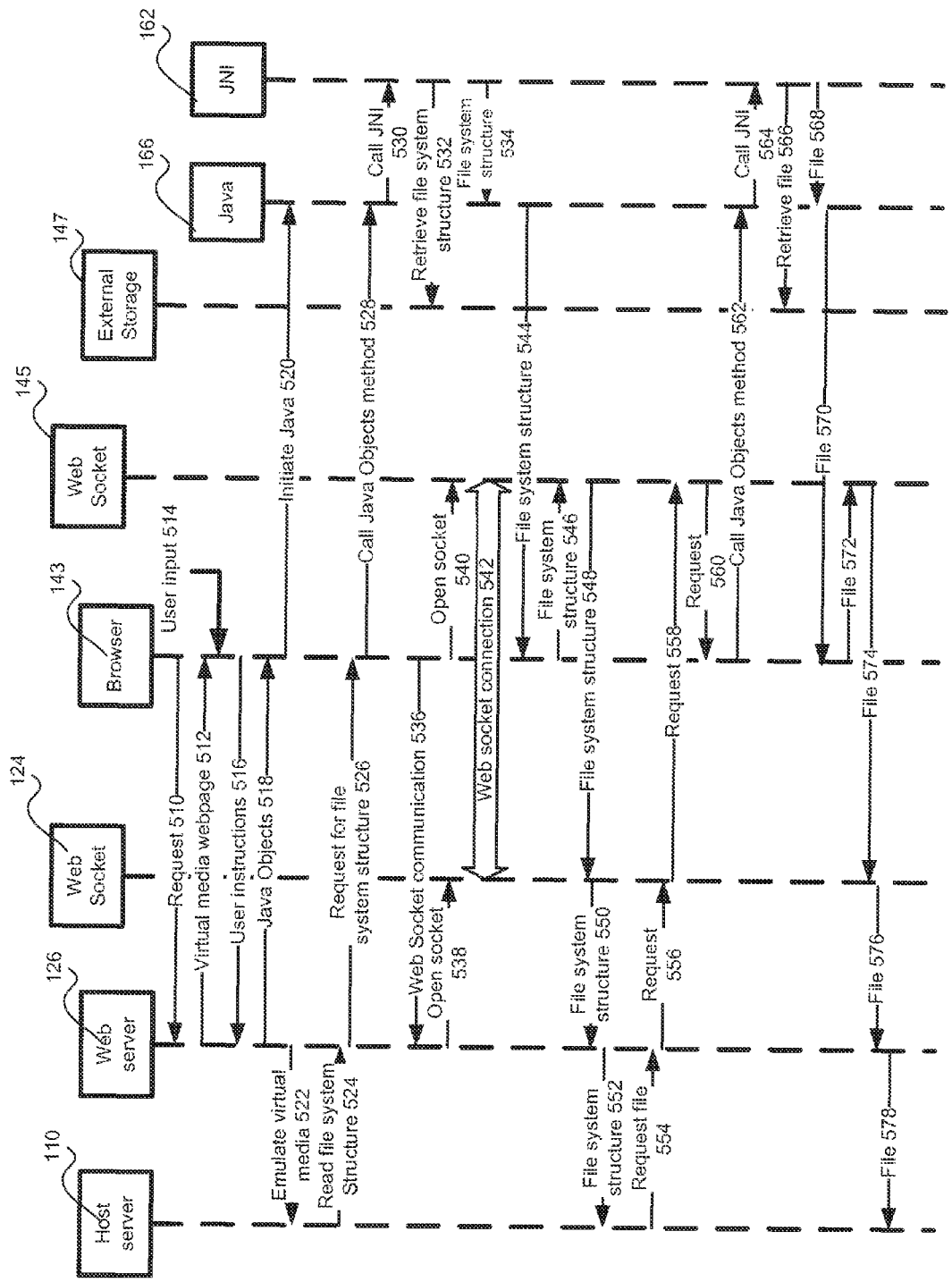
FIG. 5B schematically depicts the web-based virtual media redirection process in FIG. 5A.

FIGS. 5A and 5B schematically depict features of a web-based virtual media redirection according to another embodiment of the present disclosure. In this example, the host computer 110, the BMC 120, the computing device 140 have similar configurations as those shown in FIG. 4A with some differences as will be discussed below. The computing device 140 can have a storage 147, e.g., an individual mass storage device separated from the storage 142, connected to the computing device 140 through the I/O port 146. The storage 147 can have files that are not stored in the ISO image format. For example, at least one file 149 is stored in the storage 147. Examples of the storage 147 may include USB drives, hard drives, floppy disks, optical drives, or any other types suitable of data storage devices.

In certain embodiments, the browser program 143 can use native calls to retrieve the file system structure and files of the storage 147. For example, the browser program 143 can include a Java virtual machine (JVM) that can execute Java objects downloaded from the BMC 120 with the permission of a user operating the browser program. The Java objects can call Java Native Interface (JNI) functions. JNI is a programming framework that enables Java code running on a JVM to call, and to be called by, native applications (programs specific to a hardware and operating system platform) and libraries written in other languages such as C, C++ and assembly. The JNI functions can provide access to functions of an operating system such as system calls. The BMC 120 may include Java objects 164, which are precompiled and define functions that can be invoked by the browser program 143 to access data of the computing device 140, for example, through the JNI functions supported by the JVM. In one example, the Java objects 164 define a mount image function that utilizes the JNI functions to retrieve file system structure and files of a specified media source. A webpage generated by the web server 126 of the BMC 120 and rendered by the browser program 143 can have JavaScript routines that instruct the browser program to execute the Java objects 164 on the JVM and call the mount image function of the Java objects 164 to access the file system of the storage 147.

FIG. 5B illustrates procedures of a media redirection among the host computer 110, the BMC 120, and the computing device 140 in accordance with certain arguments of the present disclosure. At operation 510, the browser program 143 sends a request to the BMC 120 for a virtual media redirection webpage via the network. The request may be in the HTTP format. Upon receiving the request, at operation 512, the web server 126 of the BMC 120 sends the virtual media redirection webpage to the browser program 143. Thus, the browser program 143 may display the virtual media redirection webpage, allowing the user of the computing device 140 to input or select the configuration information of a virtual media that is to be emulated by the BMC 120 at operation 514. The configuration information of the virtual media may include the type of the virtual media to be emulated by the BMC 120 and the data on the computing device 140 that are to be emulated as the content of the emulated virtual media. In certain embodiments, the virtual media webpage may provide a list of available media sources and a list of the various types of the virtual media, e.g., CD-ROM, SD memory, USB drive, etc., for the user to select from.

As will be discussed below, in certain embodiments, the virtual media redirection webpage rendered by the browser program 143 can use JavaScript to instruct the browser program 143 to access the file system of the storage 147 of the computing device 140.

At operation 514, a user can configure the virtual media module 122 through the virtual media redirection webpage rendered at the browser program 143. For example, the user can configure the BMC 122 emulates a CD-ROM to the host computer 110 and use the data of the storage 147 as the content of the emulated CD-ROM.

After the user inputs the configuration information and approves the access to the native libraries and the file system, at operation 516, the browser program 143 sends the user instructions for setting up the virtual media module 122 to the web server 126 of the BMC 120. Upon receiving the user instructions from the web server 126, the virtual media module 122 accordingly emulates the requested type of virtual media (e.g., a CD-ROM) to the host computer 110.

At operation 518, the redirection webpage instructs the browser program 143 to download the Java objects 164 from the web server 126 at the BMC 120. For security reasons, typically the browser program 143 asks the user's permission before downloading and executing the Java objects 164. With the user's permission, the browser program 143 downloads the Java objects 164 from the web server 126. Upon receiving the Java objects 164, at operation 520, the browser program 143 can initiate a Java execution environment such as a JVM.

Meanwhile, upon receiving the user instructions, at operation 522, the virtual media module 122 emulates the requested type of virtual media (e.g., a CD-ROM) to the host computer 110. When the host computer 110 detects the emulated virtual media and perceives it as a real physical media, at operation 524, the host computer 110 may attempt to read the file information of the emulated virtual media. In certain embodiments, the file information includes a file system structure, e.g., a list of filenames of the virtual media. Upon receiving the request for the file system structure, at operation 526, the virtual media module 122 can instruct the web server 126 to send a HTTP response message, e.g. a webpage having JavaScript requesting the file system structure of a selected media source (e.g., a USB drive of the computing device 140), to the browser program 143. When the browser program 143 receives the HTTP response message, at operation 528, the browser program 143, e.g. as instructed by the JavaScript, will attempt to access the selected media source 147 to retrieve the file system structure. More specifically, the JavaScript in the webpage can instruct the browser program 143 to use the Java objects 164 downloaded from the web server 126 at the BMC 120 to access the selected media source 147. Accordingly, the browser program initiates or executes the Java objects 164 on the JVM 166 of the browser program 143. The JavaScript can instruct the browser program 143 to call the mount image function discussed above to retrieve information from the selected media source 147. At operation 530, the Java objects 164, in accordance with the routine defined in the mount image function, can call JNI functions 162 to use functions of the operating system, such as system calls, to retrieve the file system structure from the selected media source 147. At operation 534, the JNI function 162 returns the file system structure to the Java objects 164 running on the JVM 166 of the browser program 143.

Then, in certain embodiments, at operation 536, the browser program 143 sends a Web Socket handshake request to the web server 126 for establishing a communication channel under the Web Socket protocol. Upon receiving the Web Socket handshake request, at operation 538, the web server 126 instructs a Web Socket module 124 at the BMC 120 to open a web socket. Similarly, at operation 540, the browser program 143 instructs a Web Socket module 145 to open a web socket. At operation 542, the Web Socket connection may be established between the Web Socket module 124 and the Web Socket module 145.

In certain embodiments, once the Web Socket connection is established, at operation 544, Java objects 164 return the file system structure of the storage 147 (i.e., the selected media) to the browser program 143. The browser program 143 then, for example as instructed by the JavaScript in the redirection webpage, transmits the file system structure of the storage 147 to the host computer 110 through the Web Socket connection 150. The JavaScript routines may include code such as socket.send ("data"). Specifically, at operation 546, the browser program 143 sends the file system structure to the Web Socket module 145. At operation 548, the Web Socket module 145 sends the file system structure to the Web Socket module 124 through the Web Socket connection 150. At operation 550, the Web Socket module 124 sends the file system structure to the web server 126 of the BMC 120. The web server 126 then sends the file system structure to the virtual media module 122. The virtual media module provides the file system structure to the host computer 110 at operation 552 as a result of the read file system structure command initiated by the host computer 110 at operation 524 and directed to the virtual media emulated by the virtual media module 122. Thus, the host computer 110 obtains an emulated file system structure of the virtual media, and may request files and data from the virtual media.

When the host computer 110 attempts to read a certain file from the emulated virtual media, at operation 554, the virtual media module 122 receives such a read command initiated by the host computer 110. The virtual media module 122 then instructs the web server 126 the request a particular file. The web server 126 then sends the request for file to the browser program 143 through the web socket connection 150. Specifically, at operation 556, the web server 126 sends the request to the Web Socket module 124. At operation 558, the Web Socket module 124 sends the request to the Web Socket module 145 through the Web Socket connection. Then, at operation 560, the Web Socket module 145 sends the request to the browser program 143. Upon receiving the request, at operation 562, the browser program 143 executes a routine defined for handling such an event in a webpage that is generated by the web server 126 and that is currently rendered by the browser program 143. For example, the routine may instruct the browser program 143, according to the request received through the web socket connection, to access the selected media source 147 to retrieve the file as specified in the request.

Upon receiving the request, at operation 562, the browser program 143, e.g. as instructed by the JavaScript, attempts to access the selected media source 147 to retrieve the requested file 149. More specifically, the JavaScript in the redirection webpage can instruct the browser program 143 to use the Java objects downloaded from the web server 126 at the BMC 120 to access the selected media source 147. Accordingly, the browser program initiates or executes the Java objects 164 on the JVM 166 of the browser program 143. The JavaScript can instruct the browser program 143 to call a file retrieval function to retrieve a specified file from the selected media source 147. At operation 564, the Java objects 164, in accordance with the routine defined in the file retrieval function, can call JNI functions to use functions of the operating system, such as system calls, to retrieve the requested file 149 from the selected media source 147. At operation 568, the JNI functions 162 return the file to the Java objects 164 running on the JVM 166 of the browser program 143. At operation 570, the Java objects 164 send the file 149 to the browser program 143.

At operation 572, the browser program 143 sends the file 149 to the Web Socket module 145. At operation 574, the Web Socket module 145 sends the file 149 to the Web Socket module 124 through the Web Socket connection. At operation 576, the Web Socket module 124 sends the file 149 to the web server 126 of the BMC 120. The web server 126 then sends the file 149 to the virtual media module 122. The virtual media module 122 provides the file 149 to the host computer 110 at operation 578 as a result of the read file command initiated by the host computer 110 at operation 554 and directed to the virtual media emulated by the virtual media module. Thus, the host computer 110 obtains the file 149 from the virtual media.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present disclosure is defined by the appended claims rather than the foregoing description and the exemplary embodiments described therein.

What is claimed is:

1. A method of performing a virtual media redirection, comprising:
    establishing a WebSocket protocol connection between a web server of a baseboard management controller (BMC) and a browser program of a computing device in a network, wherein the BMC performs a management function of a host computer;
    emulating, at the BMC, virtual media to the host computer;
    receiving, at the BMC, a first read command from the host computer and directed to the emulated virtual media, wherein the first read command specifies a file system structure of a file system on the emulated virtual media;
    in response to the first read command, sending, at the BMC, a first request for the file system structure to the browser program;
    receiving, at the web server, the file system structure from the browser program;
    providing, at the BMC, the file system structure to the host computer;
    receiving, at the BMC, a second read command from the host computer and directed to the emulated virtual media, wherein the second read command specifies a first file in the file system based on the file system structure provided;
    in response to the second read command, sending, at the BMC, a second request for the first file according to the second read command to the browser program through the WebSocket protocol connection; and
    receiving, at the web server, the first file from the browser program through the WebSocket protocol connection.

2. The method as claimed in claim 1, comprising:
    receiving, at a Web Socket module of the BMC, a WebSocket protocol handshake request from a Web Socket module of the computing device; and
    sending, by the Web Socket module of the BMC, a handshake response message corresponding to the WebSocket protocol handshake request back to the Web Socket module of the computing device to establish the WebSocket protocol connection.

3. The method as claimed in claim 1, further comprising:
    generating, at the web server of the BMC, a redirection webpage, wherein the redirection webpage is programmed to instruct the browser program to access a file or the file system structure of the file system in a storage of the computing device; and
    sending, at the web server, the redirection webpage to the browser program.

4. The method as claimed in claim 3, wherein the redirection webpage is programmed to instruct the browser program to
    retrieve the first file from the storage in accordance with the second request; and
    send the first file to the web server through the WebSocket protocol connection.

5. The method as claimed in claim 3, wherein the redirection page is programmed to instruct the browser program to access the file or the file system structure of the file system from an ISO image in the storage, wherein the first file is located in the ISO image.

6. The method as claimed in claim 3, wherein the storage is an external storage to the computing device.

7. The method as claimed in claim 3, wherein the redirection page is programmed to instruct the browser program to send the file system structure or the file of the file system in a selected media in the storage to the web server through the WebSocket protocol connection.

8. The method as claimed in claim 1, further comprising:
    connecting the BMC to an input/output (I/O) port of the host computer such that the virtual media emulated by the BMC is accessible for the host computer through the I/O port.

9. The method as claimed in claim 8, wherein the I/O port is a USB port.

10. The method as claimed in claim 1, wherein the WebSocket protocol connection is a secure WebSocket protocol connection.

11. A baseboard management controller (BMC), comprising:
    a processor; and
    a storage device storing computer executable code, wherein the computer executable code comprises a web server and a redirection module,
    wherein the web server, when executed at the processor, is configured to
        establish a WebSocket protocol connection between the BMC and a browser program of a computing device in a network;
        receive a file system structure of a file system from the browser program; and
        receive a first file in the file system from the browser program through the WebSocket protocol connection; and
    wherein the redirection module, when executed at the processor, is configured to
        emulate a virtual media to a host computer;
        receive a first read command from the host computer and directed to the emulated virtual media, wherein the first read command specifies a file system structure of a file system on the emulated virtual media;

in response to the first read command, send a first request for a file system structure of a file system at the computing device to the browser program;

provide the file system structure to the host computer;

receive a second read command from the host computer and directed to the emulated virtual media, wherein the second read command specifies the first file in the file system based on the file system structure provided; and in response to the second read command, send a second request for the first file according to the second read command to the browser program through the WebSocket protocol connection, wherein the BMC performs a management function of the host computer.

12. The BMC of claim 11, wherein the web server is further configured to generate a redirection webpage, wherein the redirection webpage is programmed to instruct the browser program to access a file or the file system structure of the file system in a storage of the computing device; and send the redirection webpage to the browser program, wherein the redirection page is programmed to instruct the browser program to send the file system structure or the file of the file system in a selected media in the storage to the web server through the WebSocket protocol connection.

13. A non-transitory computer storage medium having computer-executable instructions stored thereon which, when executed by a processor of a baseboard management controller (BMC), cause the processor to:

establish a WebSocket protocol connection between a web server of the BMC and a browser program of a computing device in a network, wherein the BMC performs a management function of a host computer;

emulate virtual media to the host computer;

receive a first read command from the host computer and directed to the emulated virtual media, wherein the first read command specifies a file system structure of a file system on the emulated virtual media;

in response to the first read command, send a first request for the file system structure to the browser program;

receive the file system structure from the browser program;

provide the file system structure to the host computer;

receive a second read command from the host computer and directed to the emulated virtual media, wherein the second read command specifies a first file in the file system based on the file system structure provided;

in response to the second read command, send a second request for the first file according to the second read command to the browser program through the WebSocket protocol connection; and receive, at the web server, the first file from the browser program through the WebSocket protocol connection.

14. The non-transitory computer storage medium as claimed in claim 13, further comprising computer-executable instructions stored thereon that, when executed by the processor of the BMC, cause the processor to:

receive, at a Web Socket module of the BMC, a WebSocket protocol handshake request from a Web Socket module of the computing device; and send, at the Web Socket module of the BMC, a handshake response message corresponding to the WebSocket protocol handshake request back to the Web Socket module of the computing device to establish the WebSocket protocol connection.

15. The non-transitory computer storage medium as claimed in claim 13, further comprising computer-executable instructions stored thereon that, when executed by the processor of the BMC, cause the processor to:

generate, at the web server, a redirection webpage, wherein the redirection webpage is programmed to instruct the browser program to access a file or the file system structure of the file system in a storage of the computing device; and send, at the web server, the redirection webpage to the browser program.

16. The non-transitory computer storage medium as claimed in claim 15, wherein the redirection webpage is programmed to instruct the browser program to retrieve the first file from the storage in accordance with the second request; and send the first file to the web server through the WebSocket protocol connection.

17. The non-transitory computer storage medium as claimed in claim 15, wherein the redirection page is programmed to instruct the browser program to access the file or the file system structure of the file system from an ISO image in the storage, wherein the first file is located in the ISO image, wherein the storage is an external storage to the computing device, and wherein the redirection page is programmed to instruct the browser program to send the file system structure or the file of the file system in a selected media in the storage to the web server through the WebSocket protocol connection.

18. The non-transitory computer storage medium as claimed in claim 13, further comprising computer-executable instructions stored thereon that, when executed by the processor of the BMC, cause the processor to communicate with an input/output (I/O) port of the host computer such that the virtual media emulated by the BMC is accessible for the host computer through the I/O port.

* * * * *